Oct. 4, 1966 D. W. KERMODE 3,277,431
SHIP SEPARATION CONTROL SYSTEM
Filed Jan. 8, 1965 4 Sheets-Sheet 1
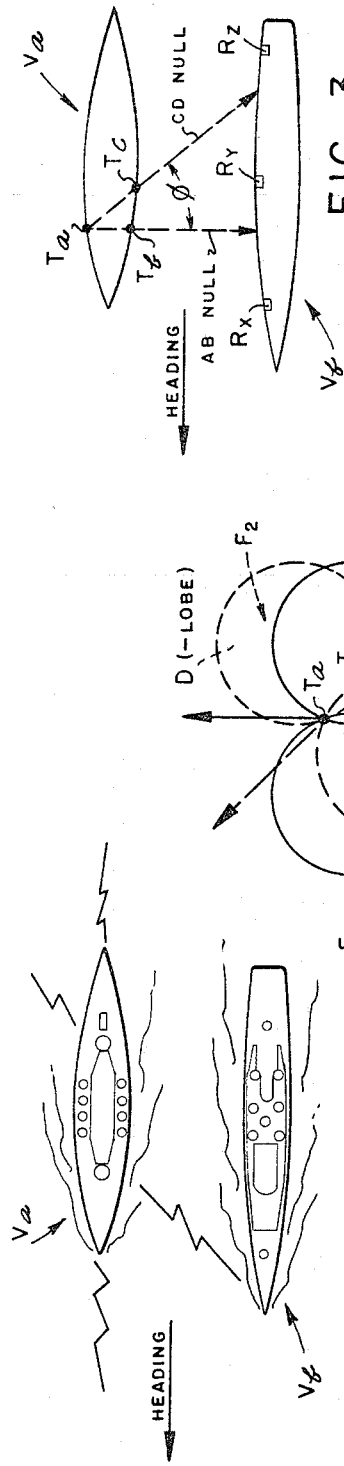
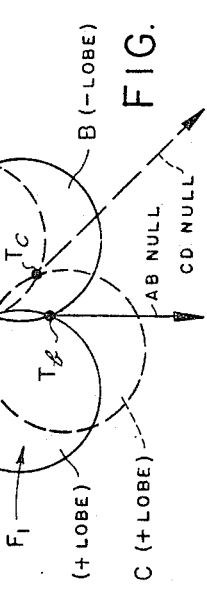
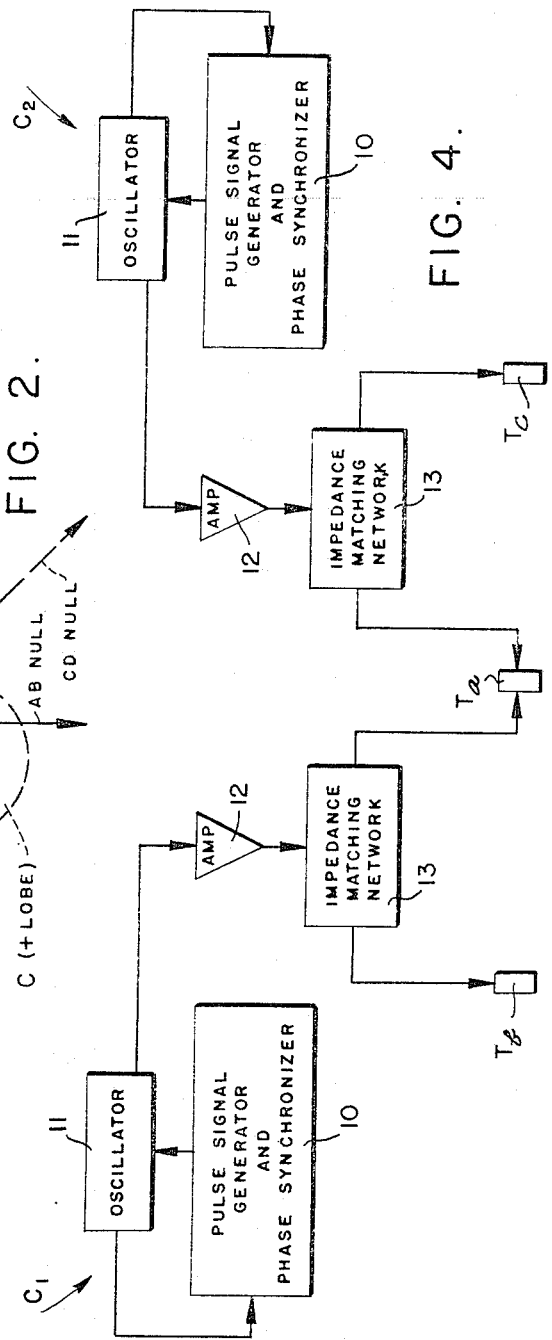
INVENTOR.
DAVID W. KERMODE
BY
P. H. Fisht
ATTORNEY

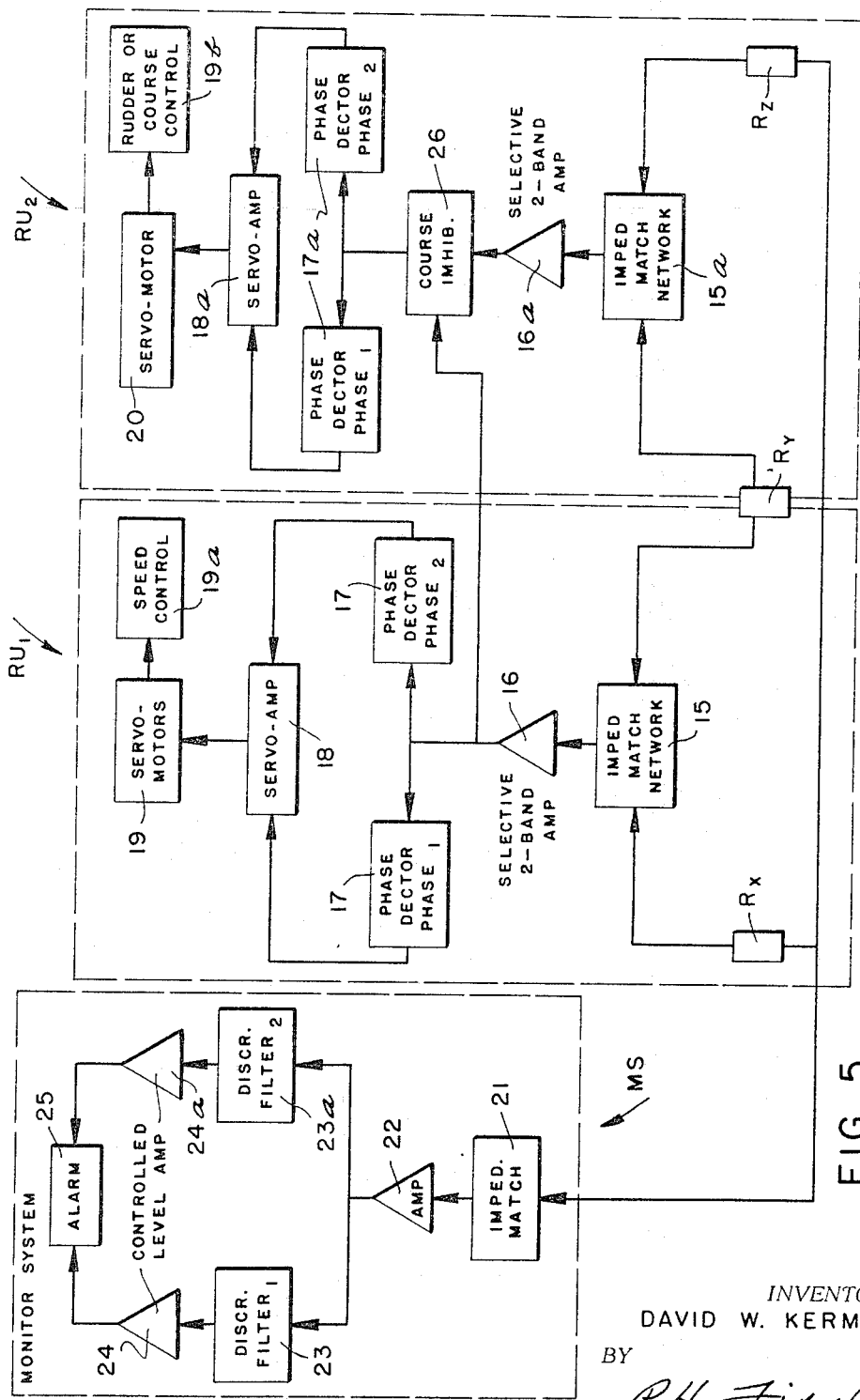

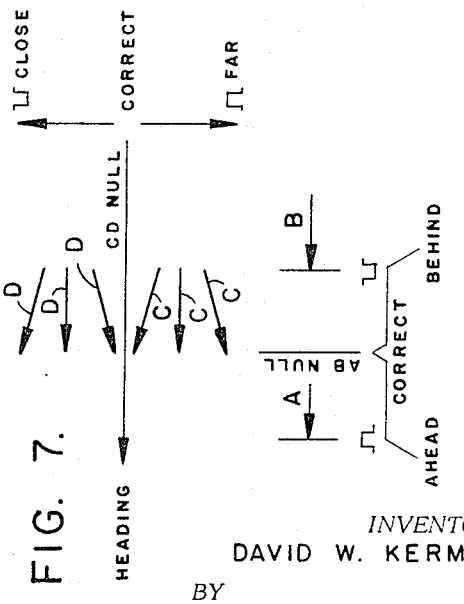

Oct. 4, 1966   D. W. KERMODE   3,277,431
SHIP SEPARATION CONTROL SYSTEM
Filed Jan. 8, 1965   4 Sheets-Sheet 4

FIG. 9.

| POSITION OF LEAD | COURSE | DISTANCE | PHASE | PHASE | SPEED & HEADING MANOUVER |
|---|---|---|---|---|---|
| ON | PARALLEL | CORRECT | AB NULL | CD NULL | NONE |
| ON | PARALLEL | CLOSE | AB NULL | D ⊓ | LEFT TURN TO AB+CD |
| ON | PARALLEL | FAR | AB NULL | C ⊓ | RIGHT TURN TO AB+CD |
| AHEAD | PARALLEL | CORRECT | A ⊓ | C ⊓ | DECREASE SPEED TO AB+CD |
| BEHIND | PARALLEL | CORRECT | B ⊓ | D ⊓ | INCREASE SPEED TO AB+CD |
| AHEAD | PARALLEL | CLOSE | A ⊓ | D ⊓ | DECREASE SPEED TO AB & LEFT TURN TO CD |
| AHEAD | PARALLEL | FAR | A ⊓ | C ⊓ | DECREASE SPEED TO AB & RIGHT TURN TO AB+CD |
| BEHIND | PARALLEL | CLOSE | B ⊓ | D ⊓ | INCREASE SPEED TO AB+D & LEFT TURN TO AB+CD |
| BEHIND | PARALLEL | FAR | B ⊓ | C ⊓ | INCREASE SPEED TO AB+C & RIGHT TURN TO AB+CD |
| ON | LEFT | CORRECT (H) | AB NULL | C ⊓ | RIGHT TURN TO AB+CD |
| ON | RIGHT | CORRECT (H) | AB NULL | D ⊓ | CONTINUE TO AB+CD |
| AHEAD | LEFT | CORRECT (H) | A ⊓ | C ⊓ | DECREASE SPEED TO AB+C & RIGHT TURN OR DECREASE SPEED TO AB+CD |
| AHEAD | RIGHT | CORRECT (H) | A ⊓ | D ⊓ | DECREASE SPEED TO AB+C & RIGHT TURN TO AB+CD OR DECREASE SPEED TO AB+CD |
| AHEAD | LEFT | CLOSE | A ⊓ | C ⊓ | DECREASE SPEED TO AB+D & LEFT TURN TO AB+CD OR DECREASE SPEED TO AB+CD |
| AHEAD | LEFT | FAR | A ⊓ | C ⊓ | DECREASE SPEED TO AB+C & RIGHT TURN TO AB+CD OR INCREASE SPEED TO AB+CD |
| BEHIND | LEFT | CORRECT (H) | B ⊓ | D ⊓ | INCREASE SPEED TO AB+D & LEFT TURN TO AB+CD OR INCREASE SPEED TO AB+CD |
| BEHIND | RIGHT | CORRECT (H) | B ⊓ | D ⊓ | INCREASE SPEED TO AB+D & LEFT TURN TO AB+CD OR INCREASE SPEED TO AB+CD |
| BEHIND | LEFT | CLOSE | B ⊓ | D ⊓ | INCREASE SPEED TO AB+D & LEFT TURN CONTINUED TO AB+CD OR INCREASE SPEED TO AB+CD |
| BEHIND | RIGHT | FAR | B ⊓ | C ⊓ | INCREASE SPEED TO AB+C & RIGHT TURN TO AB+CD OR INCREASE SPEED TO AB+CD |

NOTE – AB, CD REFER TO PHASE NULLS
"H" REFERS TO TRANSIENT CONDITIONS

*INVENTOR.*
DAVID W. KERMODE
BY
P. H. Fishe
ATTORNEY.

United States Patent Office 3,277,431
Patented Oct. 4, 1966

3,277,431
SHIP SEPARATION CONTROL SYSTEM
David W. Kermode, P.O. Box 5156, Ridgecrest, Calif.
Filed Jan. 8, 1965, Ser. No. 424,444
6 Claims. (Cl. 340—4)

The invention described herein may be manufactured and used by or for the Government of the United States of America for governmental purposes without the payment of any royalties thereon or therefor.

The present invention relates generally to navigational aids and more particularly to a system for imposing position correction control on one vessel of a pair of vessels operating in a side-by-side relationship, whereby the vessels or ships are caused to maintain a common speed, on a common heading, and at a preselected lateral interval.

Present methods utilized for close, parallel ship operations, such as those required for transfer-at-sea, for example, rely on visual inspection and judgment of the operators. Visual techniques are useful only when small headway is maintained and the seas are relatively calm. This results from the fact that the effectiveness of determinations made by the operators are necessarily limited by the inherent inadequacies of the human eye and brain. Directing corrective maneuvers, which leave little room for error, have heretofore been based on mental determinations of prevailing rates of change and distances and is an exceedingly difficult task to perform in rough seas, since over-correction and recorrection establishes an oscillatory motion between the vessels or ships. The difficulty of close, parallel ship operations is clearly evidenced by the many underway collisions and line partings commonly experienced in normal fleet maneuvers.

The purpose of this invention is to provide a system for improving ship separation control through an imposition of navigational control over one vessel of a pair of vessels, underway and closely aligned in a side-by-side relationship, to thus maintain a preselected distance between the pair of vessels as they proceed on a common heading.

Briefly, the invention is based on an application of phenomena associated with the transmission of alternating electrical currents through a liquid medium in the form of electromagnetic waves. In operation, transmitter electrodes are submerged beneath a first vessel of the pair of vessels, which are operating in parallel alignment at preselected distances, and connected with a pair of transmitter circuits. A pair of alternating reference fields, each of a distinct and constant frequency, are established by injecting electrical signal currents into the water through the electrodes. Each alternating field is established in a pattern including a pair of oppositely extending lobes having a well defined null, or minimum energy line, extending transversely therebetween. The fields are radiated to extend from the first vessel in directions which cause the nulls to be directed outwardly from the sides of the first vessel. The second vessel is provided with a pair of receiver circuits having submerged electrodes connected therewith for detecting the field established nulls, through the utilization of the frequency and phase characteristics of the radiated signals of the reference fields. Correction of relative speed and distance error is then made possible, for maintaining parallel and side-by-side ship alignment, through a determination of the position of the second vessel or ship with respect to the first ship, as indicated by the position of the second ship relative to the nulls extending from the first ship. Since the direction of the nulls serves to provide a basis for determining position error, the nulls must be as sharp or well defined as possible. Consequently, alternating fields are required and field strength is of importance only insofar as it is required that the signals be detected. In the event that no signals are being detected, an alarm system indicating such conditions is coupled with the receiver circuits, whereby false guidance is avoided. Further, a course control inhibitor is included in the receiver circuits in order to suppress unrequired course changes to thus reduce undesired oscillatory motion of the second vessel as it is brought into a desired alignment with respect to the first vessel.

An object of the instant invention is to provide a control system for improving ship separation control during transfer-at-sea operations.

Another object is to provide an underwater guidance system for maintaining a close side-by-side relationship between two ships proceeding along parallel courses.

A further object is to provide an underwater navigational system capable of utilizing reference field nulls for imposing navigational control over one ship of a pair of ships in order to maintain a desired speed and distance relationship therebetween.

Yet another object is to provide a system including an underwater transmitter and an underwater receiving system for establishing a pair of alternating reference fields in a given body of water and utilizing the phase characteristics of the fields for obtaining intelligence with respect to the relative positions of a pair of ships operating in a parallel alignment for an underway transfer of personnel or cargo.

Other objects, advantages and novel features of the invention will become apparent from the following detailed description of the invention when considered in conjunction with the accompanying drawings wherein:

FIG. 1 comprises a schematic view of a pair of ships operating on a common heading in parallel alignment;

FIG. 2 comprises a diagrammatic view of the field patterns radiated from one vessel and detected by the other vessel of FIG. 1;

FIG. 3 is a diagrammatic view illustrating the relative positioning of the ships with respect to the field nulls of the fields illustrated in FIG. 2;

FIG. 4 is a schematic view of a transmitter circuit, in block form, utilized in establishing the fields illustrated in FIG. 2;

FIG. 5 is a schematic view, also in block form, of the receiver and computer circuit utilized in detecting the relative positions of the field nulls of the reference fields established by the circuit of FIG. 4, and in imposing navigational control on one ship of the pair of ships illustrated in FIG. 1;

FIG. 6 includes a graphic illustration of the output signals obtainable from the receiver circuit of FIG. 5, under the three conditions normally encountered in maintaining parallel alignment between the ships of FIG. 1;

FIG. 7 is a diagrammatic view illustrating the conditions encountered in FIG. 6;

FIG. 8 is a diagrammatic view illustrating typical receiver circuit output signal changes encountered during the transient stages of ship position correction maneuvers; and FIG. 9 comprises a chart indicating the speed and heading maneuvers required to correct detected position error.

Turning now to FIG. 1, a pair of vessels Va and Vb| are depicted as operating in a close, parallel relationship and proceeding at a common speed. The vessel or ship Va is provided with three submerged electrodes Ta, Tb, and Tc, FIG. 3, radiating a pair of alternating reference fields $F_1$ and $F_2$, FIG. 2.

Field $F_1$ comprises an alternating reference field radiated at a first frequency from electrodes Ta and Tb, while reference field $F_2$ comprises an alternating reference field radiating at another frequency from electrodes Ta and Tc, FIGS. 2–4. The electrodes Ta, Tb, and Tc are submerged beneath the water line of ship Va and serve to establish the alternating reference fields $F_1$ and $F_2$ in the surrounding water.

As is well-known, a reference field established by a pair of radiating electrodes establishes a field including a pair of oppositely directed lobes extending normal to straight line drawn therebetween. Further, a reference field null will be directed outwardly from the electrodes, between the established lobes, along extensions of the straight line drawn between the electrodes. Therefore, the electrodes Ta and Tb are, in practice, transversely aligned across the longitudinal axis of the vessel Va. Preferably, the electrode Ta is mounted along the vessel's keel near the forward end thereof, while the electrode Tb is spaced therefrom and mounted below the vessel's water line. Consequently, the pattern of the alternating field $F_1$, includes fore and aft extending lobes A and B, having an inverted elecrical phase relationship, and an AB null directed outwardly therefrom at right angles thereto.

The submerged electrode Tc is displaced rearwardly and outwardly from the electrode Ta, or along a line extending diagonally across the vessel Va. The electrodes Ta and Tc are caused to radiate at a second frequency for establishing the alternating field $F_2$ having oppositely extending lobes C and D, with a CD null directed diagonally with respect to the longitudinal axis of the ship Va, FIGS. 2 and 3. The electrical phase relationship of lobes C and D is also inverted.

Suitable insulating material may be employed in mounting the electrodes Ta–Tc to the vessel Va. Within the vessel, and connected with the electrodes Ta, Tb, and Tc is a pair of transmitter circuits $C_1$ and $C_2$, FIG. 4, which serve to supply energy or transmitter output signals to the electrodes. It will be noted that the electrode Ta serves as a common electrode for both circuits $C_1$ and $C_2$, whereby simultaneous transmission of fields $F_1$ and $F_2$ is effected. Means for transmitting multiplex signals could be utilized, however, it is considered that the complexity of such means would be disproportional to energy savings realized when utilizing such means. However, if desired a separate electrode may be employed for simultaneous or alternate transmission of the output signals from $C_1$ and $C_2$.

The circuits $C_1$ and $C_2$ each comprise a transmitting circuit employing conventional circuit components including a pulse signal generator and phase synchronizer 10, an oscillator 11, operating at a preselected frequency, a signal amplifier 12, and an impedance matching network 13, the output of which is fed to the electrodes Ta, Tb, and Tc, whereby a first alternating signal may be transmitted from the pair of electrodes Ta and Tb and a second alternating signal may be transmitted from the pair of electrodes Ta and Tc.

Frequency filters at the transmitters are not required where a separate transmitting oscillator and amplifier are provided for each signal frequency transmitted. Practical operation of the system requires that the respective phases of the transmitted signal be easily identified at the receiver. This is made possible by utilizing the oscillator 11 to superimpose on the field or carrier frequency one or more identifying pulses at the beginning of, or during the time interval of one phase of each cycle. The superimposed pulse has a rise and fall time equivalence of a greater frequency. For example, if one of the pulse generators 10 establishes a basic carrier frequency of 20 kilocycles, the identifying superimposed pulse frequency provided by the associated oscillator 11 may be in the neighborhood of 200 kilocycles. The superimposed pulse may be either positive or negative, e.g., additive or subtractive, relative to the phase being identified and may be added to one phase and subtracted from the other. Consequently, the phase of each signal is thus made readily identifiable so that confusion may be obviated at the receiver.

Mounted within the vessel Vb is a pair of receiver units $RU_1$ and $RU_2$, FIG. 5, which are designed to receive, through electrodes Rx, Ry, and Rz, the signals radiated from the electrodes Ta, Tb, and Tc. The electrodes Rx, Ry, and Rz are disposed beneath the water line of the vessel Vb on a line extending parallel to the longitudinal axis thereof, FIG. 3.

The longitudinal displacement of the electrodes Rx, Ry, and Rz is such that the field nulls AB and CD will bisect the distances therebetween when the ships are in parallel alignment with a preselected distance therebetween, in the absence of relative lead error, or progression misalignment, FIG. 3. Here it is to be noted that the submerged electrode Ry also comprises a common electrode, which is common to both of the receiver units $RU_1$ and $RU_2$. Therefore, the positioning of the electrode Ry dictates the distance and progression alignment to be established between the vessels Va and Vb.

The receiver units $RU_1$ and $RU_2$ each include conventional receiver-circuit components which detect the radiated signals, filter out undesired frequencies, determine the phase of the detected signal and drive a reversible servomotor in response to the phase of the received signal and impose a control signal on a selected control unit. As illustrated in FIG. 5, electrodes Rx and Ry are connected to an impedance matching network 15, while the electrode Rz is connected to an impedance matching network 15a along with the electrode Ry. The impedance matching networks 15 and 15a serve to drive a pair of selective two-band amplifiers 16 and 16a.

The amplifiers 16 and 16a discriminate, on a frequency basis, amplify the received signals and feed selected signals, comprising the field frequency with the imposed identifying frequencies to phase detectors 17 and 17a, which then provide outputs to servo-amplifiers 18 and 18a for driving the outputs thereof in accordance with the detected phase of the amplified signals from the amplifiers 16 and 16a. The output signal from the servo-amplifier 18 serves to drive a reversible servomotor 19 connected with a ship speed control mechanism 19a, while the output signal from the servo-amplifier 18a comprises an integrated signal which is used to drive a course control, reversible servomotor 20, whereby speed and course changes may be imposed on the vessel Vb in accordance with the predominant electrical phase of the received signals of fields $F_1$ and $F_2$.

Since the system of the instant invention utilizes the nulls of the fields $F_1$ and $F_2$ to derive position intelligence, as hereinbefore mentioned, it is possible for a signal to be lost without sufficient warning. Therefore, a monitor and alarm system MS, FIG. 5, is connected with the electrodes Rx and Rz. This system receives the signals picked up by the electrodes Rx and Rz, and will, for practical purposes, continuously receive the signals due to the fact that the electrodes Rx and Rz are off-set with respect to the line of the field nulls of fields $F_1$ and $F_2$.

The monitor circuit MS includes an impedance matching network 21, an amplifier 22, which serves to amplify the output from the network 22, a pair of frequency discriminator filters 23 and 23a, a pair of controlled amplifiers 24, 24a and an alarm circuit 25, which may be of a type including a conventional bridge circuit and which becomes unbalanced to provide an alarm signal when only one of the fields $F_1$ and $F_2$ is present.

Therefore, it will be understood that when only the signals of one of the fields $F_1$ and $F_2$ is present, or when Ry is receiving signals from only one field, the monitor or alarm circuit MS serves to indicate this condition, whereby a distinction between the absence of a signal field and a reception of a null by electrode Ry may be established for avoiding false guidance or correction maneuvers.

In order that the operation of the units $RU_1$ and $RU_2$ may be more clearly understood, reference is made to FIGS. 6–8. Turning to FIG. 6, in particular, the three position conditions which will initiate a change in the output signals obtained from the circuits $RU_1$ and $RU_2$ may be designated LEAD, which indicates progression lead or lag error for vessel $Vb$, i.e., whether the vessels $Va$ and $Vb$ are in an abreast alignment; COURSE, which indicates vessel parallel alignment error; and DISTANCE, which indicates vessel spacing error, or whether the ships $Va$ and $Vb$ are separated by a predetermined distance.

It is to be noted that each of receiver circuits $RU_1$ and $RU_2$ will provide a signal which is positive or negative going, depending upon which of the lobes predominates at the receiving electrodes. If no lobe predominates, then the nulls are being directed in the preselected manner and no correction maneuver is required. Any change in the phase of received signals indicates a change in relative positions for the vessels, and therefore requires that position correction maneuvers be imposed on vessel $Vb$.

Referring back to FIGS. 2 and 3, it will be noted that if the vessel $Vb$ is ahead of a predetermined abreast position of, or leads, vessel $Va$, the AB null will be closer to the electrode $Ry$ causing the output from the receiver $RU_1$ to become positive, FIG. 6, due to the influence of lobe A, however, if vessel $Vb$ lags vessel $Va$, the AB null will move closer to electrode $Rx$, whereupon the output from the reeciver $RU_1$ will become negative under the influence of lobe B. If the output is neither positive or negative predominating, the AB null is correctly positioned half-way between the electrodes $Rx$ and $Ry$ and the abreast position of the vessels $Va$ and $Vb$ is being maintained.

The phase of the signal from $RU_2$ will vary with the change in lead, but this signal may be disregarded while the vessels are being brought into desired abreast alignment. This is achieved through a course inhibitor circuit 26, FIG. 5, which is triggered by a change in the phase of the signals received from $RU_1$ and serves to block course control, or the output from $RU_2$ until the AB null is again properly positioned with respect to electrodes $Rx$ and $Ry$. Speed changes will be effected through the servomotor 19 driving a speed control device 19a.

Any existing distance error, i.e., the distance between the vessels $Va$ and $Vb$, must also be detected and corrected as hereinbefore mentioned. When distance error exists, the signals obtains from $RU_2$ will vary in accordance with changes in the position of the CD null with respect to the electrodes $Ry$ and $Rz$. If vessel $Vb$ is too far from vessel $Va$, the signal output from $RU_2$ will be positive going due to the fact that the CD null will be caused to approach the electrode $Rz$ and the received signals from lobe C will be predominant. On the other hand, if the vessels are too close together, a negative going signal will predominate, since the CD null will be caused to approach the electrode $Ry$, as also illustrated in FIG. 6. Since the AB null extends at right angles with the longitudinal axis the vessel $Va$, no change in phase of the output signals from $RU_1$ will be detected. The output obtained from the reversible servomotor 20, of $RU_2$, is used to drive a course correction device, such as, for example, a rudder control mechanism 19b.

FIGS. 7 and 8 serve to illustrate transient conditions, or those conditions prevailing as the vessels $Va$ and $Vb$ are brought into desired alignment. As depicted in FIG. 7, when the vessel $Vb$, represented by arrows, is ahead or behind $Va$, a predominating signal, having a positive or negative characteristic, is provided until the vessels are again aligned abreast, or in a correct relative position with respect to LEAD. If the vessel $Vb$ is too close to vessel $Va$ a signal having a D lobe or negative phase, represented by D, will be predominant and if it is too far, the predominating signal will have a C lobe or positive characteristic, represented by C. If the vessel $Vb$ is too close to vessel $Va$, the course thereof must be changed. Consequently, signals from $RU_2$ having a greater negative than positive value will be fed to the servomotor 20, thus causing the ship $Vb$ to turn outwardly away from ship $Va$. As the ship changes course a transient condition arises, whereby both C and D signals are present, due to the ship's angle with respect to field $F_2$. So long as the signals are predominantly negative, the ship $Vb$ will continue to progress outwardly from ship $Va$. However, once the ship or vessel $Vb$ crosses the CD null line the signals will become predominantly positive, as illustrated in FIG. 8, causing the servomotor 20 to drive the course control device to swing the ship $Vb$ back to the right, with respect to its line of travel. This will cause the ship $Vb$ to come back to the correct CD null alignment. A similar technique is employed when the ships $Va$ and $Vb$ begin alignment maneuvers with too great a distance therebetween. In other words, when the vessels $Va$ and $Vb$ are operating too close together, the phase of the output signals from $RU_2$ indicate that the signals of lobe D are predominating, and if they are too far apart, the phase of the output signals indicates that the signals of lobe C are predominant. If the phase of the output signals from $RU_2$ indicate that the null is aligned between the electrodes $Ry$ and $Rz$, the distance between the vessels $Va$ and $Vb$ will be correct.

It will be noted that when the vessel $Vb$ is turned to the right or to the left, a C phase or positive signal component will be introduced, but it will be appreciated that this condition is temporary and that the signals will have predominantly positive or negative phase characteristics, depending upon relationship of the ship to the CD null line, and the correction maneuver will be maintained until such time as the CD null line becomes properly aligned, whereupon the vessel $Vb$ will be properly aligned with respect to the vessel $Va$.

The chart of FIG. 9, serves to further illustrate the various position errors that may be imposed on the vessel or ship $Vb$ and the maneuvers required for bringing the vessel $Vb$ into desired alignment relative to the vessel $Va$.

In operation, the vessel $Va$ is assumed to be radiating two fields $F_1$ and $F_2$ from the electrodes $Ta$, $Tb$, and $Tc$, with two field nulls AB and CD extending through the water, from the vessel $Va$. The fields $F_1$ and $F_2$ are radiated at different pulse frequencies, superimposed on the carrier frequencies, by the oscillators 10. Conventional techniques are employed as the ship or vessel $Vb$ is brought into an approximate alignment with vessel $Va$. The receiver units $RU_1$ and $RU_2$ may now be activated for bringing the vessels into and maintained in precise alignment utilizing the system of the present invention. Assume that the position of vessel $Vb$ is such that it is ahead of $Va$, as indicated "ahead" under POSITION OF LEAD, FIG. 9; that the "COURSE" of the vessels is "parallel," but the "DISTANCE" of $Vb$ is "far." Under these conditions, the output signal from $RU_1$ will have a predominantly positive going phase characteristic, while the signals from $RU_2$ will have a positive component due to the position of the AB null, which indicates that a lobe A signal is being received, and the position of the CD null, which indicates a lobe C signal is being received. Since the output from $RU_1$ indicates that the AB null is not properly aligned with respect to the vessel $Vb$, the course inhibitor circuit will be triggered or opened to block the signals of $RU_2$. Consequently, the speed of the vessel $Vb$ will be reduced to bring the AB null into desired alignment with the electrodes $Rx$ and $Ry$. The inhibitor circuit 26 now closes and the positive going signals of lobe C of the field $F_2$ will predominate at the input to the servo-amplifier 18a, whereat they are amplified and fed to the servomotor 20. The servomotor 20 is now driven in accordance with the predominant phase of the received signals for driving the course control device 19 to thus impose a right turn on the vessel $Vb$. This new heading is now maintained until the CD null is reached, whereupon the servomotor 20 causes the vessel to be directed upon a proper heading and becomes inactivated until such time as the ship varies from its predetermined position. Through the utilization of the chart of FIG. 9, various corrective maneuvers may be determined for the various error conditions which may be found to exist.

Obviously many modifications and variations of the present invention are possible in the light of the above teachings. It is therefore to be understood that within the scope of the appended claims the invention may be practiced otherwise than as specifically described.

What is claimed is:

1. In a system for maintaining navigational control over a pair of vessels operating in an underway and side-by-side relationship and proceeding on a common heading, the combination comprising:

an electromagnetic transmitter circuit mounted within a first vessel of said pair of vessels adapted to generate beneath the water line thereof carrier signals establishing a first alternating electromagnetic reference field including a pair of oppositely extending lobes having an opposed phase relationship and an included field null extending normally from the vessel's sides, and further adapted to generate beneath the water line thereof carrier signals establishing a second alternating electromagnetic reference field including a pair of oppositely extending lobes having an opposed phase relationship and an included field null extending diagonally from the vessel's side; and an underwater receiver system disposed in the second vessel of said pair of vessels adapted to detect the reference field nulls and obtain therefrom intelligence indicative of mutual vessel position error.

2. The system of claim 1, further characterized in that said transmitter includes:

an interconnected pair of submerged radiating electrodes arranged in a mutually spaced relationship and transversely aligned with respect to the vessel's keel adapted to radiate at a first frequency and cooperate in establishing said first alternating reference field; and a third submerged radiating electrode displaced from and interconnected with said pair of electrodes adapted to radiate at a second frequency and cooperate with one electrode of said pair for establishing said second alternating reference field.

3. The system of claim 1 further characterized in that said transmitter circuit further includes:

circuit means adapted to superimpose a phase identifying signal on the carrier signals of each lobe, whereby phase identification of the carrier signals is enhanced.

4. The system according to claim 3, further characterized in that said receiver system includes:

three submerged receiving system electrodes;

means interconnecting an adjacent first two of the receiving electrodes adapted to detect the field null of said first reference field and provide a first integrated output signal having a phase characteristic indicative of the relative position established between the adjacent first two of the receiving electrodes and the radiating electrodes; and means interconnecting an adjacent second two of the receiving electrodes adapted to detect the field null of said second reference field and provide a second integrated output signal having a phase characteristic indicative of a relative position established between the radiating electrodes and the second two of the receiving electrodes.

5. The system according to claim 4, further including: control means connected with the receiving system adapted to alter vessel speed and direct said second vessel along a corrective path under the dictates of the intelligence obtained by the receiver system for establishing a desired alignment between the vessels of said pair.

6. In a system for maintaining navigational control over a pair of parallel aligned operating vessels proceeding on a common heading, the combination comprising:

an underwater alternating transmitter including;

means radiating a first frequency for establishing for establishing a first alternating electromagnetic reference field having a lobe pattern comprising a pair of oppositely extending lobes aligned in fore-and-aft alignment with respect to one vessel of said pair and having a well defined, transversely directed null extending laterally therefrom;

means radiating at a second frequency for establishing a second alternating electromagnetic reference field having a lobe pattern comprising a pair of oppositely extending lobes aligned diagonally across said one vessel of said pair and having a well defined, diagonally directed null extending laterally therefrom;

an underwater receiver system disposed in the other vessel of said pair of vessels including, an underwater receiver means for detecting the signals of each lobe of the first and second reference field and means for detecting the predominant phase of the detected signals;

means for adding the phase of the received signals to provide a pair of integrated output signals indicative of vessel position error;

correction control means connected with said receiver means adapted to provide speed and course correction output signals to vessel navigational control means in accordance with the pair of integrated output signals;

a correction inhibitor circuit including means connected with the receiver means and the correction control means adapted to control the output of said correction output signals to vessel navigational control euvers imposed on said vessel in accordance with the correction output signals; and a monitor circuit connected with the receiver means adapted to provide an alarm in the presence of an absence of the first and second reference fields.

References Cited by the Applicant

UNITED STATES PATENTS 2,476,301   7/1949   Jenks.
3,086,490   4/1963   Nichols.

FOREIGN PATENTS 576,905   4/1946   Great Britain.

CHESTER L. JUSTUS, *Primary Examiner.*

R. A. FARLEY, *Assistant Examiner.*